US011924626B2

(12) United States Patent
Park et al.

(10) Patent No.: US 11,924,626 B2
(45) Date of Patent: Mar. 5, 2024

(54) SOUND TRACING APPARATUS AND METHOD

(71) Applicant: Exarion Inc., Seoul (KR)

(72) Inventors: Woo Chan Park, Seoul (KR); Ju Won Yun, Seoul (KR)

(73) Assignee: Exarion Inc., Seoul (KR)

( * ) Notice: Subject to any disclaimer, the term of this patent is extended or adjusted under 35 U.S.C. 154(b) by 245 days.

(21) Appl. No.: 17/417,620

(22) PCT Filed: Nov. 14, 2019

(86) PCT No.: PCT/KR2019/015563
§ 371 (c)(1),
(2) Date: Jun. 23, 2021

(87) PCT Pub. No.: WO2020/138716
PCT Pub. Date: Jul. 2, 2020

(65) Prior Publication Data

US 2022/0086583 A1 Mar. 17, 2022

(30) Foreign Application Priority Data

Dec. 26, 2018 (KR) ........................ 10-2018-0169213

(51) Int. Cl.
*H04R 5/02* (2006.01)
*H04S 7/00* (2006.01)

(52) U.S. Cl.
CPC .................................... *H04S 7/302* (2013.01)

(58) Field of Classification Search
CPC ........................................................ H04S 7/302
(Continued)

(56) References Cited

U.S. PATENT DOCUMENTS

2008/0232602 A1* 9/2008 Shearer ................... H04S 7/302 381/17
2012/0269355 A1 10/2012 Chandak et al.
(Continued)

FOREIGN PATENT DOCUMENTS

KR 10-2010-0128881 A 12/2010
KR 10-1076807 B1 10/2011
(Continued)

OTHER PUBLICATIONS

International Search Report for PCT/KR2019/015563 dated Feb. 25, 2020 from Korean Intellectual Property Office.

*Primary Examiner* — Ammar T Hamid
(74) *Attorney, Agent, or Firm* — Paratus Law Group, PLLC

(57) ABSTRACT

Disclosed are a sound tracing apparatus and a sound tracing method, and the sound tracing apparatus includes a first acceleration structure generation unit configured to generate a first acceleration structure for a static scene in a sound space, an intersection test execution unit configured to perform an intersection test on each of a plurality of dynamic objects constituting a dynamic scene in the sound space to detect whether or not the dynamic object affects a sound propagation path, a second acceleration structure generation unit configured to select the dynamic objects that affect the sound propagation path as a result of the intersection test and then generate the second acceleration structure for the dynamic scene, and a sound generation unit configured to generate a 3D sound by performing sound tracing based on the first and second acceleration structures.

13 Claims, 5 Drawing Sheets

(58) Field of Classification Search
USPC .................................................. 381/303, 310
See application file for complete search history.

(56) References Cited

U.S. PATENT DOCUMENTS

| | | | |
|---|---|---|---|
| 2015/0146877 | A1 | 5/2015 | Palka et al. |
| 2022/0225052 | A1 * | 7/2022 | Lyren .................. G06F 3/04847 |

FOREIGN PATENT DOCUMENTS

| | | | | |
|---|---|---|---|---|
| KR | 10 2010012888 | A | * | 10/2011 |
| KR | 10 20100128881 | A | * | 10/2011 |
| KR | 10-2016-0113036 | A | | 9/2016 |

* cited by examiner

SOUND TRACING APPARATUS AND METHOD

CROSS-REFERENCE TO PRIOR APPLICATIONS

This application is a National Stage Patent Application of PCT International Patent Application No. PCT/KR2019/015563 (filed on Nov. 14, 2019) under 35 U.S.C. § 371, which claims priority to Korean Patent Application No. 10-2018-0169213 (filed on Dec. 26, 2018), which are all hereby incorporated by reference in their entirety.

ACKNOWLEDGEMENT

National R&D Project Supporting the Present Invention

Assignment number: 1711065196

Department name: Ministry of Science and Technology Information and Communication Research and management institution: Information and Communication Technology Promotion Center Research project name: ICT convergence industry source technology development project (R&D)

Research project name: Development of mobile GPU hardware for hyper-realistic real-time virtual reality Contribution rate: 1/1

Organized by: Sejong University Industry-University Cooperation Foundation

Research period: Jan. 1, 2018 to Dec. 31, 2018

BACKGROUND

The present disclosure relates to a sound processing technology, and more particularly, to a sound tracing apparatus and a method capable of efficiently performing sound rendering by dynamically building an acceleration structure for a sound space.

Recently, due to development of a mobile technology, a graphics technology, a sensory input/output technology, or the like, an interest in a virtual reality technology is rapidly increasing. Most virtual reality-related technologies are concentrated only on visual elements, but in order to support a realistic virtual reality environment, it is essential to reproduce an aural sense of space in addition to a visual sense of space. In order to reproduce the auditory sense of space, a 3D sound technology using a multi-channel audio system or a head related transfer function (HRTF) is used.

A sound rendering technology based on a 3D geometric model can perform simulation by reflecting a location of a listener, the number and locations of sound sources, and surrounding objects and materials in a virtual space. Through this, the sound rendering technology based on the 3D geometric model reproduces physical characteristics of sound, such as reflection, transmission, diffraction, and absorption, and thus, a user can be provided with an auditory spatial feeling. However, in order to simulate physically based sound on surrounding objects and materials in real time, calculation costs are high and power consumption also is large.

CITATION LIST

Patent Document

Korean Patent Registration No. 10-1076807 (Oct. 19, 2011)

SUMMARY

An embodiment of the present disclosure provides a sound tracing apparatus and method capable of efficiently performing sound rendering by dynamically building an acceleration structure for a sound space.

An embodiment of the present disclosure also provides a sound tracing apparatus and method capable of reducing a load on generating an acceleration structure that should be performed in every frame by repeatedly selecting a dynamic object and generating a second acceleration structure.

An embodiment of the present disclosure also provides a sound tracing apparatus and method capable of generating an acceleration structure for a dynamic scene by selecting only dynamic objects of which an intersection test result with a bounding box of each of a plurality of dynamic objects is true.

In embodiments, there is provided a sound tracing apparatus including: a first acceleration structure generation unit configured to generate a first acceleration structure for a static scene in a sound space, an intersection test execution unit configured to perform an intersection test on each of a plurality of dynamic objects constituting a dynamic scene in the sound space to detect whether or not the dynamic object affects a sound propagation path, a second acceleration structure generation unit configured to select the dynamic object that affects the sound propagation path as a result of the intersection test and then generate the second acceleration structure for the dynamic scene, and a sound generation unit configured to generate a 3D sound by performing sound tracing based on the first and second acceleration structures.

The first acceleration structure generation unit may generate the first acceleration structure using geometry data stored in a local memory in a pre-processing step of the sound tracing.

The first acceleration structure generation unit may generate the first acceleration structure having a tree shape based on a plurality of static objects constituting the static scene.

The intersection test execution unit may perform the intersection test by detecting whether or not a bounding box for the dynamic objects exists between a sound source and a listener.

The second acceleration structure generation unit may generate the second acceleration structure having the same tree shape as that of the first acceleration structure.

When the intersection test result is true, the second acceleration structure generation unit may select the corresponding dynamic object as the dynamic object that affects the sound propagation path.

The sound generation unit may integrate the first and second acceleration structures into a single structure and then perform the sound tracing.

The sound generation unit may integrate the first and second acceleration structures into a tree having the same shape as those of the first and second acceleration structures and then perform the sound tracing.

In embodiments, there is provided a sound tracing method including: (a) generating a first acceleration structure for a static scene in a sound space, (b) executing an intersection test for detecting whether each of a plurality of dynamic objects constituting a dynamic scene in the sound space affects a sound propagation path, (c) selecting the dynamic objects that affect the sound propagation path as a result of the intersection test and then generating the second acceleration structure for the dynamic scene, and (d) generating a 3D sound by performing sound tracing based on the first and second acceleration structures.

The sound tracing method may further include repeatedly performing (a) to (d) for each frame.

The above (b) may include detecting whether a bounding box for the dynamic objects exists between a sound source and a listener to perform the intersection test.

The above (c) may include selecting, when the intersection test result is true, the corresponding dynamic object as the dynamic object that affects the sound propagation path. The above (d) may include integrating the first and second acceleration structures into a single structure and then performing the sound tracing.

DETAILED DESCRIPTION

Figure 1:
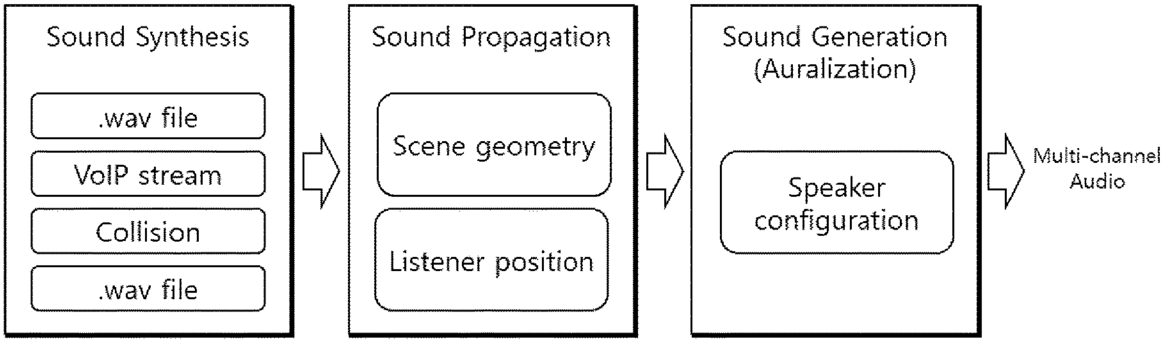
FIG. 1 is a diagram describing a pipeline of sound tracing.

Descriptions of the present disclosure are merely an embodiment for structural or functional description, and a scope of the present disclosure should not be construed as being limited by embodiments described in the specification. That is, since the embodiments can be variously changed and have various forms, the scope of the present disclosure should be understood as including equivalents capable of realizing the technical idea. In addition, since objects or effects presented in the present disclosure do not mean that a specific embodiment should include all or only such effects, the scope of the present disclosure should not be understood as being limited thereto.

Meanwhile, meaning of terms described in the present application should be understood as follows.

Terms such as “first” and “second” are used to distinguish one component from other components, and the scope of rights is not limited by these terms. For example, a first component may be referred to as a second component, and similarly, a second component may be referred to as a first component.

When a component is referred to as being “connected” to another component, it should be understood that although it may be directly connected to the other component, another component may exist therebetween. Meanwhile, when it is mentioned that a component is “directly connected” to another component, it should be understood that there is no other component therebetween. Meanwhile, other expressions describing a relationship between components, that is, “between” and “just between” or “neighboring” and “directly neighboring” should be similarly interpreted.

Singular expressions are to be understood as including plural expressions unless the context clearly indicates otherwise, terms such as “include” or “have” are intended to designate the existence of characteristics, number, step, action, component, part, or combination of implemented features, and it is to be understood that the possibility of the existence or addition of one or more other features, numbers, steps, actions, elements, parts, or combinations thereof is not preliminarily excluded.

In each step, identification codes (for example, a, b, c, or the like) are used for convenience of explanation, the identification code does not describe the order of each step, and each of the steps may occur in a different order than the specified order unless the context clearly indicates a specific order. That is, each of the steps may occur in the same order as specified, may be performed substantially simultaneously, or may be performed in the reverse order.

The present disclosure can be embodied as computer-readable code on a computer-readable recording medium, and the computer-readable recording medium includes all types of recording devices storing data that can be read by a computer system. Examples of computer-readable recording media include ROM, RAM, CD-ROM, magnetic tape, floppy disk, optical data storage device, or the like. Further, the computer-readable recording medium is distributed over a computer system connected through a network, and thus, computer-readable codes can be stored and executed in a distributed manner.

All terms used herein have the same meaning as commonly understood by one of ordinary skill in the field to which the present disclosure belongs, unless otherwise defined. Terms defined in commonly used dictionaries should be construed as having meanings in the context of related technologies, and cannot be construed as having an ideal or excessively formal meaning unless explicitly defined in the present application.

FIG. 1 is a diagram describing a pipeline of sound tracing.

Referring to FIG. 1, the sound tracing pipeline may include a sound synthesis step, a sound propagation step, and a sound generation (auralization) step. Among the sound tracing processing steps, the sound propagation step may correspond to the most important step for giving immersion to virtual reality, and may correspond to a step that has high computational complexity and takes the longest computation time. In addition, whether or not this step is accelerated can influence real-time processing of the sound tracing. The sound synthesis step may correspond to a step of generating a sound effect according to a user's interaction. For example, in the sound synthesis step, it is possible to process a sound that occurs when a user knocks on a door or drops an object, and the sound synthesis step may correspond to a technique commonly used in existing games and UIs.

The sound propagation step is a step of simulating a process of transmitting a synthesized sound to a listener through virtual reality, and may correspond to a step of processing acoustic characteristics (reflection coefficient, absorption coefficient, or the like) and sound characteristics (reflection, absorption, transmission, or the like) of the virtual reality 3D sound based on a scene geometry of the virtual reality or game. The sound generation step may correspond to a step of regenerating an input sound based on a configuration of a listener speaker using sound characteristic values (reflection/transmission/absorption coefficients, distance attenuation characteristics, or the like) calculated in the propagation step.

Figure 2:
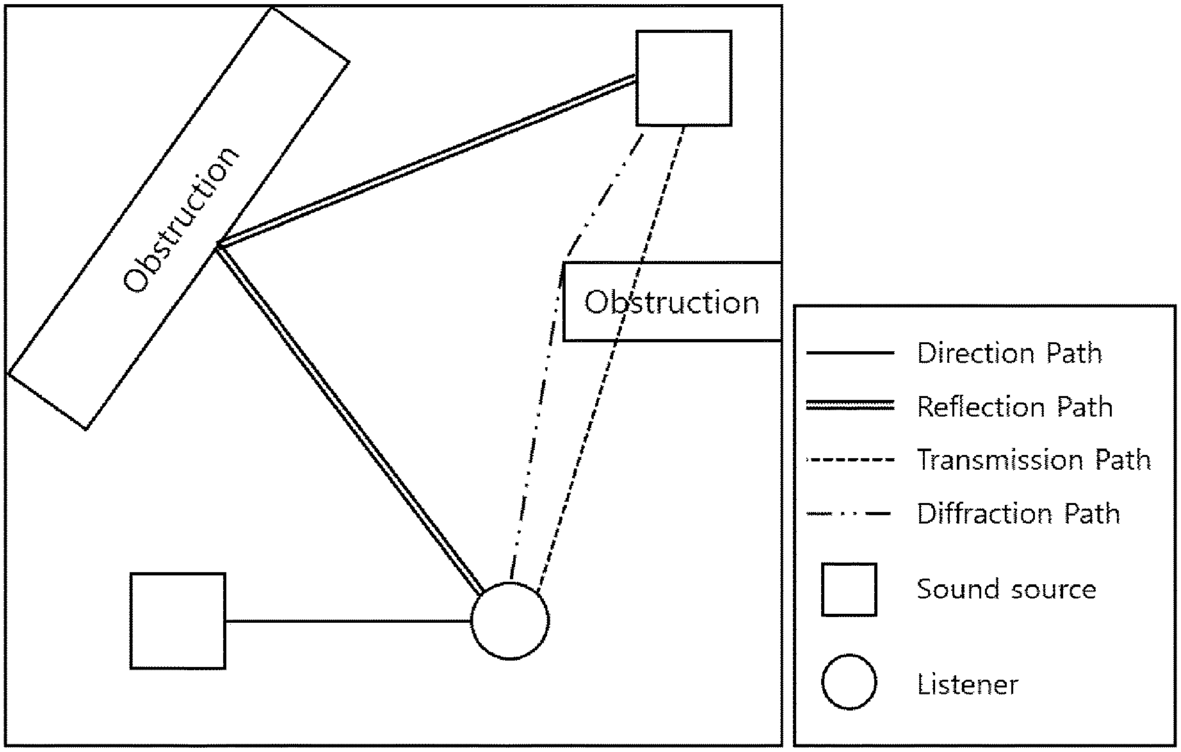
FIG. 2 is a diagram describing types of sound propagation paths in a virtual space.

FIG. 2 is a diagram describing types of sound propagation paths in a virtual space.

Referring to FIG. 2, a direct path may correspond to a path that is directly transmitted without any obstruction between a listener and a sound source. A reflection path may correspond to a path through which a sound is reflected after colliding with an obstruction and reaches the listener, and a transmission path may correspond to a path through which a sound passes through the obstruction and is transmitted to the listener when there is the obstruction between the listener and the sound source.

The sound tracing can shoot an acoustic ray at positions of multiple sound sources and shoot the acoustic ray at a position of the listener. Each shot acoustic ray may find a geometry object colliding with the acoustic ray, and generate an acoustic ray corresponding to reflection, transmission, and diffraction for the collided object. This process may be repeatedly performed recursively. In this way, the acoustic ray shot from the sound sources and the acoustic ray shot from the listener may meet each other, and a path through which they meet may be referred to as a sound propagation path. As a result, the sound propagation path may mean an effective path through which a sound originating from a position of the sound source passes through reflection, transmission, absorption, diffraction, or the like to reach the listener. A final sound may be calculated with these sound propagation paths.

Figure 3:
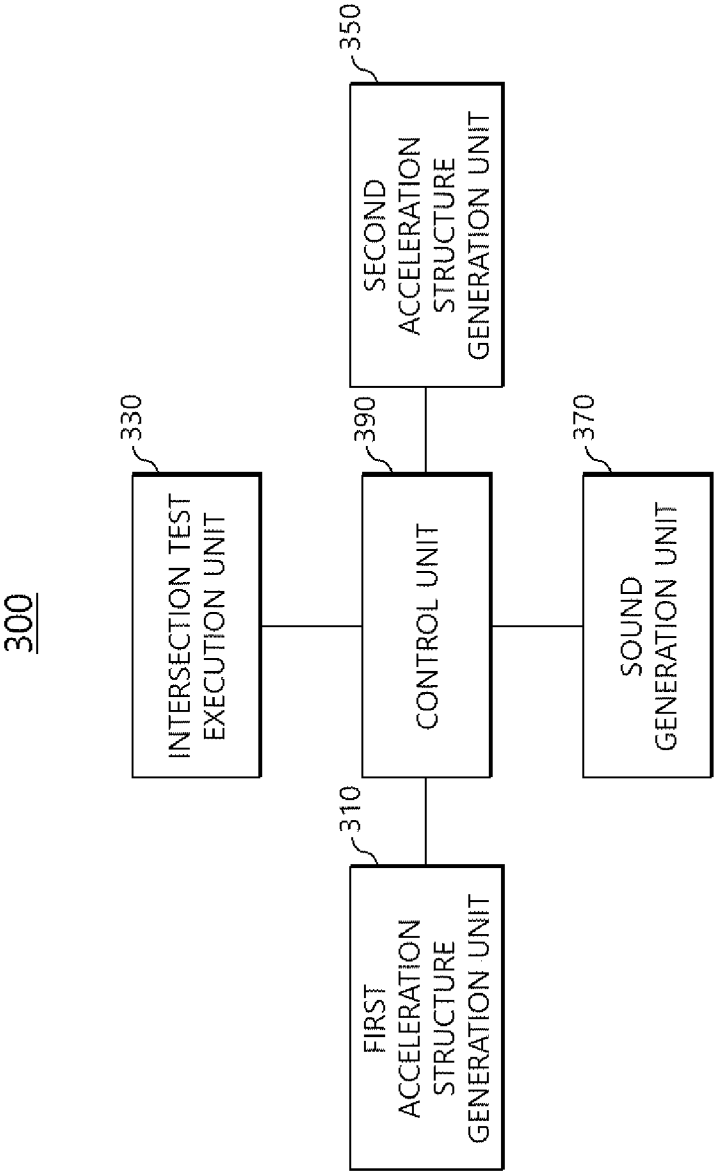
FIG. 3 is a block diagram describing a functional configuration of a sound tracing apparatus according to one embodiment of the present disclosure.

FIG. 3 is a diagram describing a sound tracing apparatus according to one embodiment of the present disclosure.

Referring to FIG. 3, a sound tracing apparatus 300 includes a first acceleration structure generation unit 310, an intersection test execution unit 330, a second acceleration structure generation unit 350, a sound generation unit 370, and a control unit 390.

In one embodiment, the sound tracing apparatus 300 may be implemented to include an internal memory, and may further include a memory unit that operates in conjunction with an external memory. The memory unit may control data storage and read operations for the memory, and may include a plurality of partial memories that are logically divided and independently operated in a memory area. For example, the sound tracing apparatus 300 may operate in conjunction with an external system memory and an internal local memory, geometry data for a static scene, geometry data for a dynamic scene, and sound data which is a sound source may be stored in the system memory. Moreover, the local memory may include geometry data and an acceleration structure for a static scene, geometry data for a dynamic scene that is selectively determined for the entire dynamic scene, an acceleration structure, and sound data.

The first acceleration structure generator 310 may generate a first acceleration structure for the static scene in the sound space. Here, the sound space may correspond to a space to be subjected to sound tracing and may include an object, the sound source, and a sound sink. The object can be divided into a static object that cannot be actively moved and a dynamic object that can be actively moved. For example, in a 3D image, the static object may correspond to a background scene and the dynamic object may correspond to characters. The sound source may correspond to a device that outputs a sound, and may correspond to a speaker, for example. The sound sink is a concept corresponding to a sound source, may correspond to an object that absorbs a sound, and may correspond to a listener, for example.

That is, the first acceleration structure generation unit 310 may generate the first acceleration structure for a corresponding three-dimensional space based on static objects constituting a sound space. The first acceleration structure is an acceleration structure (AS) required for sound tracing and may correspond to fixed spatial information regardless of a passage of time.

In one embodiment, the first acceleration structure generation unit 310 may generate the first acceleration structure using the geometry data stored in the local memory in a pre-processing step of sound tracing. The geometry data may include triangle information constituting a corresponding sound space, and the triangle information may include a texture coordinate and a normal vector for three points constituting a triangle. Since the first acceleration structure does not changed during the sound tracing process, the first acceleration structure may be generated by the first acceleration structure generating unit 310 in a preprocessing step corresponding to a step before sound tracing is performed. The first acceleration structure generation unit 310 may store a first acceleration structure generated based on geometry data in a local memory inside the sound tracing apparatus 300.

In one embodiment, the first acceleration structure generator 310 may generate the first acceleration structure in a tree shape based on a plurality of static objects constituting a static scene. For example, the first acceleration structure generation unit 310 may use a tree shape such as a kd-tree or a Bounding Volume Hierarchy (BVH) as the first acceleration structure. The sound tracing apparatus 300 can quickly access triangles in a sound space that are needed to perform an intersection test with an acoustic ray using the generated acceleration structure. The kd-tree that can be used as the first acceleration structure will be described in more detail with reference to FIG. 5.

The intersection test execution unit 330 may perform the intersection test on each of a plurality of dynamic objects constituting the dynamic scene in the sound space to detect whether or not the dynamic object affects the sound propagation path. Information on the dynamic object may be separately stored in advance, and may include triangle information constituting the object. The intersection test execution unit 330 may select the dynamic objects that affect the sound propagation path by performing the intersection test based on triangle information on the dynamic object.

In one embodiment, the intersection test execution unit 330 may perform the intersection test by detecting whether a bounding box for the dynamic objects exists between the sound source and the listener. The intersection test execution unit 330 may determine the bounding box including the dynamic object, and may perform the intersection test based on a position of the bounding box. That is, when the position of the bounding box corresponding to the dynamic object exists between the sound source and the listener, the dynamic object may correspond to an object that can affect the sound propagation path.

In another embodiment, when a plurality of dynamic objects exist in the bounding box, the intersection test execution unit 330 may first perform the intersection test based on the position of the bounding box, and second, may perform an additional operation for detecting objects that actually affect the sound propagation path among a plurality of dynamic objects existing in the bounding box.

The second acceleration structure generator 350 may generate a second acceleration structure for the dynamic scene after selecting the dynamic objects that affect the sound propagation path as the result of the intersection test. The second acceleration structure is an acceleration structure required for the sound tracing and may correspond to spatial information that dynamically changes for each frame. That is, the second acceleration structure may include only information on dynamic objects that affect the sound propagation path among the plurality of dynamic objects constituting the sound space.

In one embodiment, the second acceleration structure generator 350 may generate the second acceleration structure in the same tree shape as the first acceleration structure.

Since the first and second acceleration structures need to be integrated into one for the sound tracing, the second acceleration structure generator 350 may generate the second acceleration structure in the same shape as the first acceleration structure. For example, when the first acceleration structure is the kd-tree, the second acceleration structure generation unit 350 may generate the second acceleration structure as the kd-tree, and when the first acceleration structure is BVH, the second acceleration structure generation unit 350 may generate the second acceleration structure as BVH.

In one embodiment, when the intersection test result is true, the second acceleration structure generator 350 may select the corresponding dynamic object as the dynamic object that affects the sound propagation path. When the intersection test result is false, the second acceleration structure generator 350 may exclude the dynamic object and generate the second acceleration structure based on only the dynamic objects of which the intersection test result is true.

More specifically, when the intersection test result is false, the dynamic object may not correspond to the direct path because the dynamic object is not located between the sound source and the listener, and thus, a probability of affecting indirect paths such as reflection and diffraction may be low. When the intersection test result is true, the corresponding dynamic object may correspond to the direct path, and when there is permeability according to a material of the dynamic object, the dynamic object may correspond to the propagation path, and the probability of affecting the indirect path may be high.

The sound generation unit 370 may generate a 3D sound by performing the sound tracing based on the first and second acceleration structures. The first and second acceleration structures may be used for the intersection test with respect to the acoustic ray generated during the sound tracing process. For example, when the acceleration structure is implemented in the form of a tree, the intersection test for the acoustic ray may perform a hierarchical search for lower nodes from a root node of the acceleration structure, may check whether or not there is an intersection with triangles existing in the visited leaf node, and when no intersection triangle is found, the intersection test may be performed by continuing a tree search and repeating the operation for the next leaf node.

In addition, the sound generation unit 370 may calculate a collision point after the intersection test, and generate a collision response through sound propagation simulation for the collision point. The sound generation unit 370 may perform the sound rendering based on the collision response and finally output the 3D sound.

In one embodiment, the sound generation unit 370 may perform the sound tracing after integrating the first and second acceleration structures into one. The sound generation unit 370 may integrate the first and second acceleration structures stored in the local memory into one, and may perform the sound tracing based on the integrated first and second acceleration structure. For example, the sound generation unit 270 may not perform the intersection test for each of the first and second acceleration structures, but only perform the intersection test for the entire acceleration structure in which the first and second acceleration structures are integrated into one. In one embodiment, the sound generation unit 370 may perform sound tracing after integrating into a tree having the same shape as the first and second acceleration structures. In order to integrate the first and second acceleration structures, each of the first and second acceleration structures should be implemented in the same form, and when both the first and second acceleration structures are implemented in the same tree shape, the sound generation unit 370 may generate the acceleration structure in the form of a single tree as the final integration result, and may then be used in the sound tracing process.

The control unit 390 may control all operations of the sound tracing apparatus 300, and manage a control flow or a data flow between the first acceleration structure generation unit 310, the intersection test execution unit 330, the second acceleration structure generation unit 350, and the sound generation unit 370.

Figure 4:
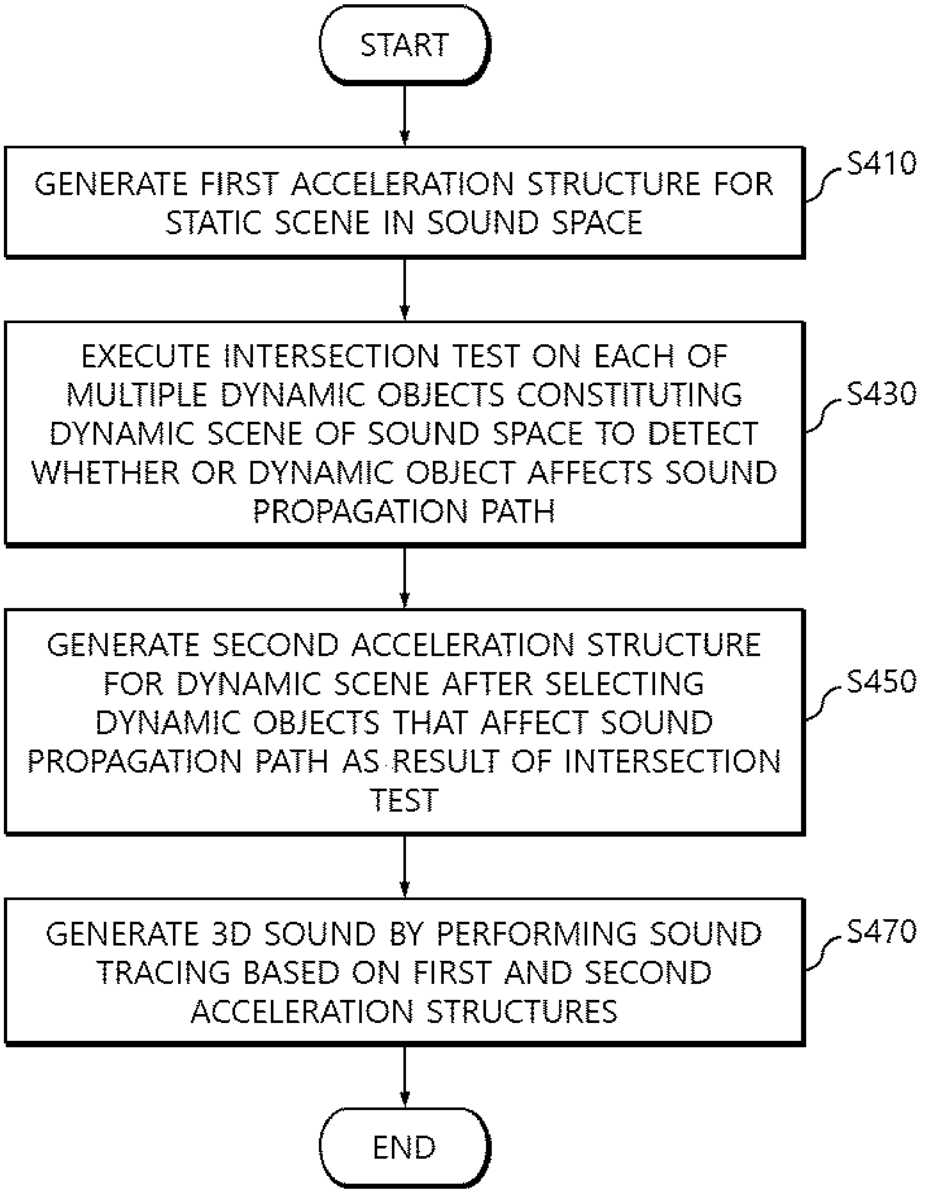
FIG. 4 is a flowchart describing a sound tracing process performed by the sound tracing apparatus of FIG. 3.

FIG. 4 is a flowchart describing the sound tracing process performed by the sound tracing apparatus of FIG. 3.

Referring to FIG. 4, the sound tracing apparatus 300 may generate the first acceleration structure for the static scene in the sound space through the first acceleration structure generator 310 (Step S410). The sound tracing apparatus 300 may perform the intersection test on each of the plurality of dynamic objects constituting the dynamic scene of the sound space through the intersection test execution unit 330 to detect whether the dynamic object affects the sound propagation path (Step S430).

The sound tracing apparatus 300 may generate a second acceleration structure for the dynamic scene after selecting the dynamic objects that affect the sound propagation path as the result of the intersection test through the second acceleration structure generator 350 (Step S450). The sound tracing apparatus 300 may generate the 3D sound by performing the sound tracing based on the first and second acceleration structures through the sound generation unit 370 (Step S470).

In one embodiment, the sound tracing apparatus 300 may sequentially repeat Steps S430 to S470 for each frame. That is, the sound tracing apparatus 300 may perform the sound tracing for each frame using the first acceleration structure for the static scene generated before the sound tracing and the second acceleration structure for the dynamic scene generated for each frame, and may generate and output the 3D sound for each frame.

Figure 5:
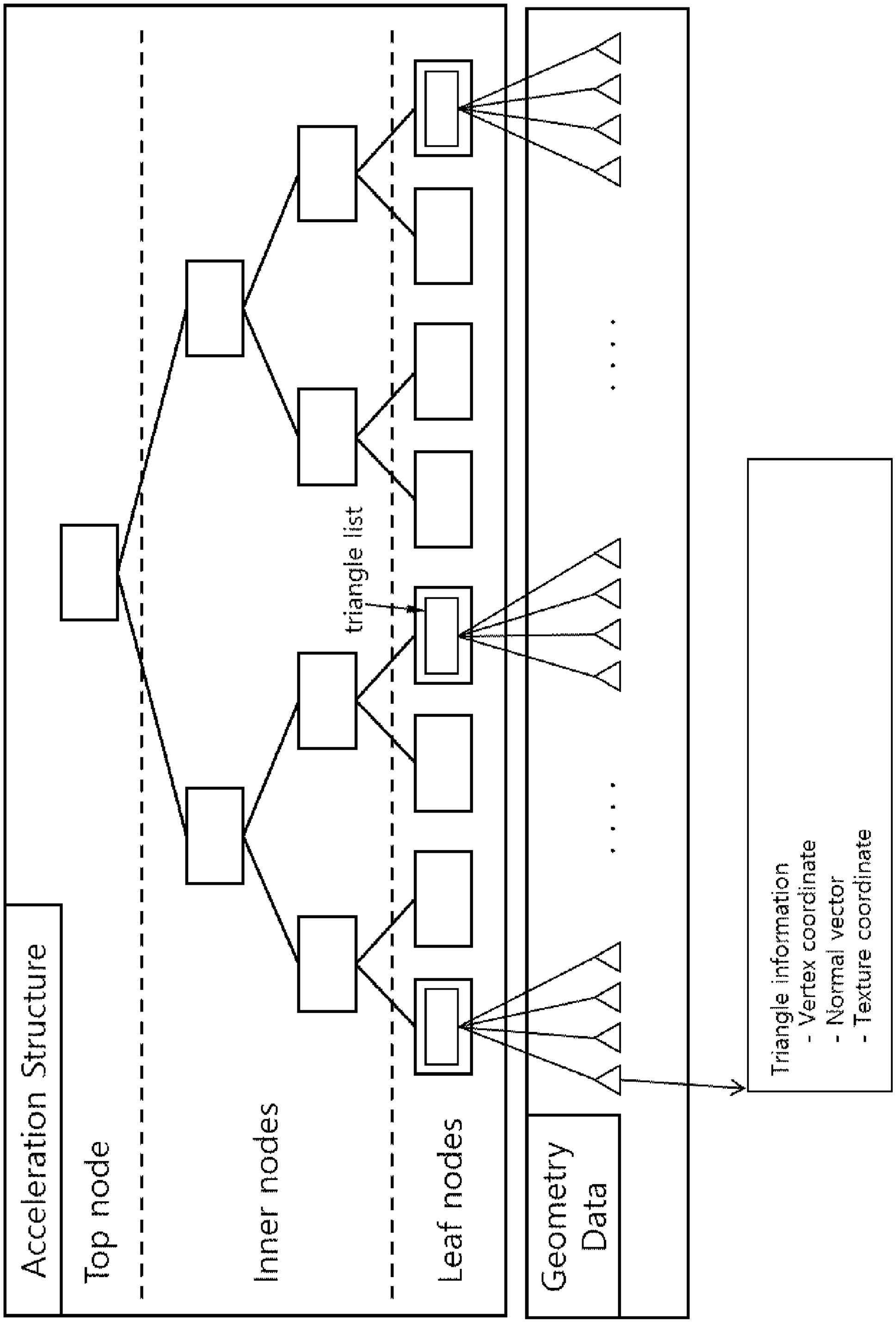
FIG. 5 is an exemplary diagram describing a kd-tree used for generating an acceleration structure in the sound tracing apparatus of FIG. 3.

FIG. 5 is an exemplary diagram illustrating the kd-tree used for generating the acceleration structure in the sound tracing apparatus of FIG. 3.

Referring to FIG. 5, the sound tracing apparatus 300 may generate the kd-tree as the acceleration structure. The kd-tree is a kind of spatial partitioning tree, and may correspond to a binary tree having a hierarchy structure for a partitioned space, and may be used for the intersection test. The kd-tree may include an inner node including a top node and a leaf node, and the leaf node may correspond to a space containing objects that intersect with the corresponding node.

In addition, the leaf node may include a triangle list for pointing at at least one triangle information included in the geometry data. The triangle information may include a vertex coordinate, a normal vector, and a texture coordinate for three points of a triangle. Meanwhile, the inner node may have a bounding box-based spatial region, which may be divided into two regions and allocated to two lower nodes. As a result, the inner node may be composed of a division plane and a sub-tree of two regions divided through the division plane. A location at which the space is divided may correspond to a point at which a cost (the number of node visits, the number of times to calculate whether it intersects with the triangular shape, or the like) for finding a triangle colliding with an arbitrary acoustic ray is minimized.

In one embodiment, if the triangle information included in the geometry data is implemented as an array, a triangle list included in a leaf node may correspond to an array index.

Figure 6:
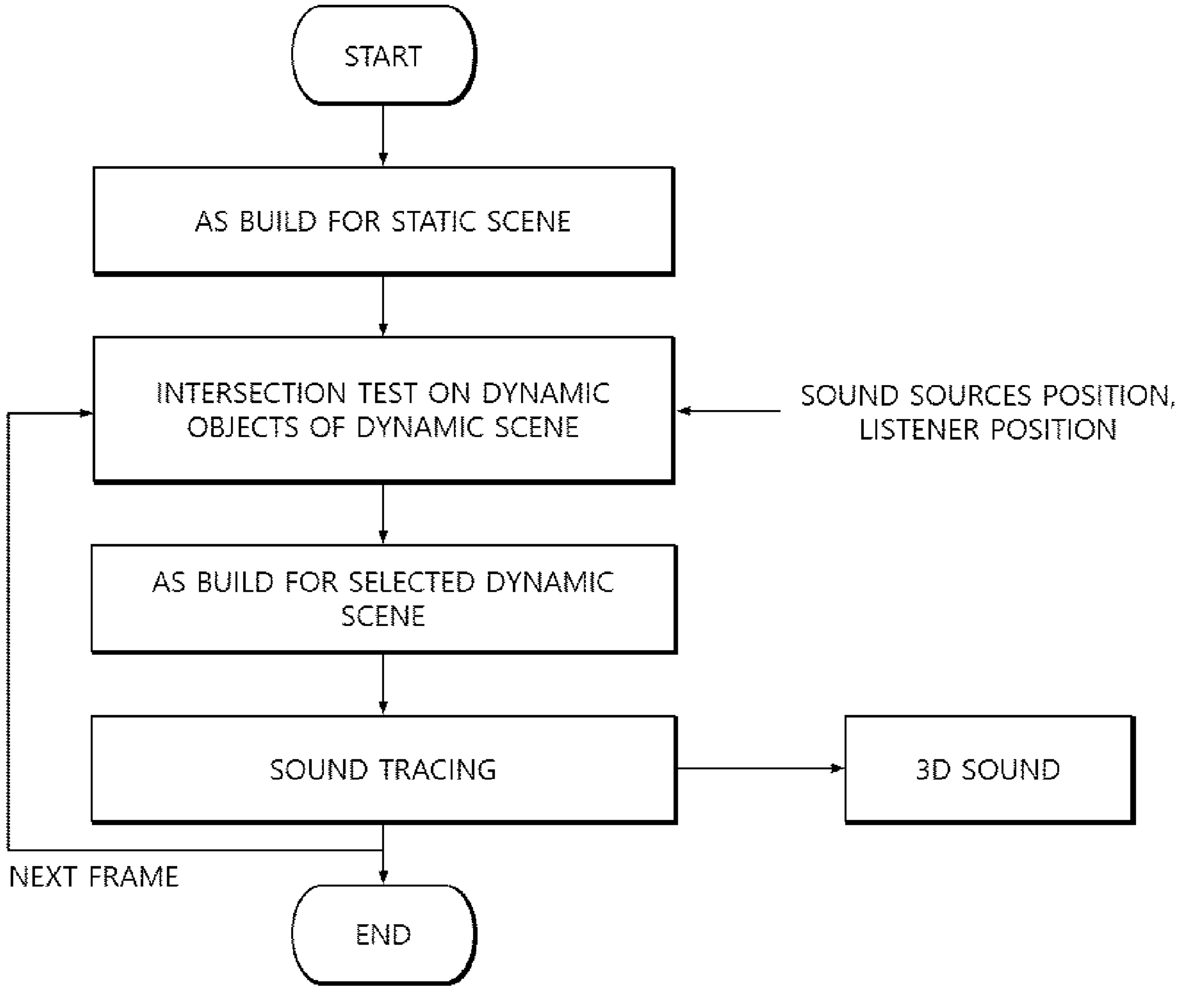
FIG. 6 is a flowchart describing a sound tracing method according to one embodiment of the present disclosure.

FIG. 6 is a flowchart illustrating a sound tracing method according to one embodiment of the present disclosure.

Referring to FIG. 6, first, the sound tracing apparatus 300 may generate the acceleration structure for the static scene. In particular, the acceleration structure for the static scene may be performed in a pre-processing step before the sound tracing is performed, may be generated as the first acceleration structure by the first acceleration structure generator 310, and may be stored in an internal local memory to be used in all operation processes of the sound tracing.

The sound tracing apparatus 300 may check whether each of the plurality of dynamic objects constituting the dynamic scene affects the sound propagation path. The intersection test execution unit 330 may perform the intersection test to detect whether the bounding box (or bounding volume) for the dynamic objects is between the position of the sound source and the position of a listener. When the intersection test result is false, the corresponding dynamic object is discarded, and when the intersection test result is true, the corresponding dynamic object may be used to generate the second acceleration structure for the dynamic scene by the second acceleration structure generator 350 along with other objects.

The sound tracing apparatus 300 may output the 3D sound by performing the sound tracing based on the second acceleration structure for the finally selected dynamic objects and the first acceleration structure for the static scene. The sound tracing apparatus 300 may repeatedly perform a sound tracing process for the next frame by performing an intersection test on a dynamic scene corresponding to the next frame after a 3D sound output is finished. That is, the sound tracing apparatus 300 may reduce a load on the generation of the acceleration structure that should be performed in every frame by repeatedly performing the selection through the intersection test and generation of the second acceleration structure for the dynamic objects constituting the dynamic scene.

Heretofore, the present disclosure is described with reference to preferred embodiments of the present disclosure. However, those skilled in the art will variously modify and change the present disclosure within a scope not departing from spirit and scope of the present disclosure described in the following claims.

The disclosed technology can have the following effects. However, since it does not mean that a specific embodiment should include all of the following effects or only the following effects, it should not be understood that a scope of rights of the disclosed technology is limited thereby.

In the sound tracing apparatus and method according to one embodiment of the present disclosure, it is possible to reduce the load on generating the acceleration structure that should be performed in every frame by repeatedly selecting the dynamic object and generating the second acceleration structure.

In the sound tracing apparatus and method according to one embodiment of the present disclosure, it is possible to generate the acceleration structure for the dynamic scene by selecting only the dynamic objects of which the intersection test result with the bounding box of each of the plurality of dynamic objects is true.

What is claimed is:

1. A sound tracing apparatus comprising:

a first acceleration structure generation unit configured to generate a first acceleration structure for a static scene in a sound space;

an intersection test execution unit configured to perform an intersection test on each of a plurality of dynamic objects constituting a dynamic scene in the sound space to detect whether or not the dynamic object affects a sound propagation path;

a second acceleration structure generation unit configured to select, based on a result of the intersection test, only the dynamic objects that affect the sound propagation path, and then generate, based on the selected dynamic objects, a second acceleration structure including only the selected dynamic objects, among the plurality of dynamic objects, that affect the sound propagation path for the dynamic scene; and a sound generation unit configured to generate a 3D sound by performing sound tracing based on the first and second acceleration structures, wherein the first acceleration structure generation unit, the intersection test execution unit, the second acceleration structure generation unit, and the sound generation unit are each implemented via at least one processor.

2. The sound tracing apparatus of claim 1, wherein the first acceleration structure generation unit is further configured to generate the first acceleration structure using geometry data stored in a local memory in a pre-processing step of the sound tracing.

3. The sound tracing apparatus of claim 1, wherein the first acceleration structure generation unit is further configured to generate the first acceleration structure having a tree shape based on a plurality of static objects constituting the static scene.

4. The sound tracing apparatus of claim 1, wherein the intersection test execution unit is further configured to perform the intersection test by detecting whether or not a bounding box for the dynamic objects exists between a sound source and a listener.

5. The sound tracing apparatus of claim 3, wherein the second acceleration structure generation unit is further configured to generate the second acceleration structure having a same tree shape as that of the first acceleration structure.

6. The sound tracing apparatus of claim 1, wherein when the intersection test result is true, the second acceleration structure generation unit is further configured to select a corresponding dynamic object as the dynamic object that affects the sound propagation path.

7. The sound tracing apparatus of claim 1, wherein the sound generation unit is further configured to integrate the first and second acceleration structures into a single structure and then performs the sound tracing.

8. The sound tracing apparatus of claim 5, wherein the sound generation unit is further configured to integrate the first and second acceleration structures into a tree having the same shape as those of the first and second acceleration structures and then performs the sound tracing.

9. A sound tracing method comprising:

(a) generating a first acceleration structure for a static scene in a sound space;

(b) executing an intersection test for detecting whether each of a plurality of dynamic objects constituting a dynamic scene in the sound space affects a sound propagation path;

(c) selecting, based on a result of the intersection test, only the dynamic objects that affect the sound propagation path and then generating, based on the selected dynamic objects, a second acceleration structure including only the selected dynamic objects, among the plurality of dynamic objects, that affect the sound propagation path for the dynamic scene; and (d) generating a 3D sound by performing sound tracing based on the first and second acceleration structures.

10. The sound tracing method of claim 9, further comprising repeatedly performing (a) to (d) for each frame.

11. The sound tracing method of claim 9, wherein (b) includes detecting whether a bounding box for the dynamic objects exists between a sound source and a listener to perform the intersection test.

12. The sound tracing method of claim 9, wherein (c) includes selecting, when the intersection test result is true, the corresponding dynamic object as a dynamic object that affects the sound propagation path.

13. The sound tracing method of claim 9, wherein (d) includes integrating the first and second acceleration structures into a single structure and then performing the sound tracing.

* * * * *